Dec. 21, 1937.  W. KONKEL  2,102,900
RESILIENT CONDUCTOR FASTENING
Filed April 20, 1936
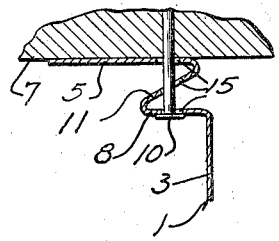
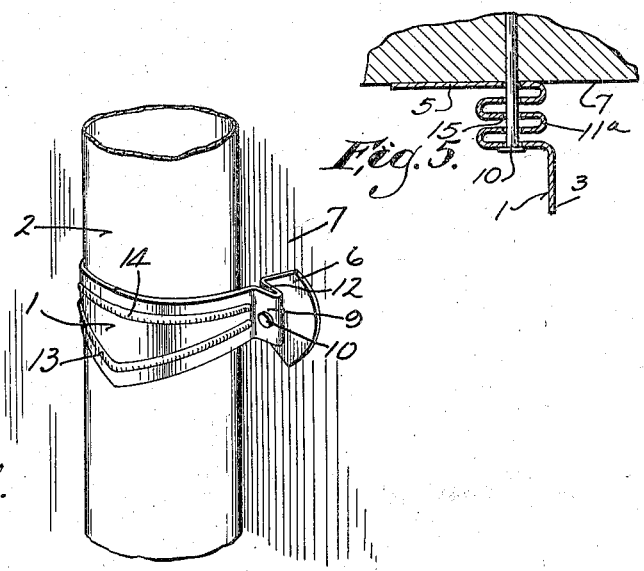
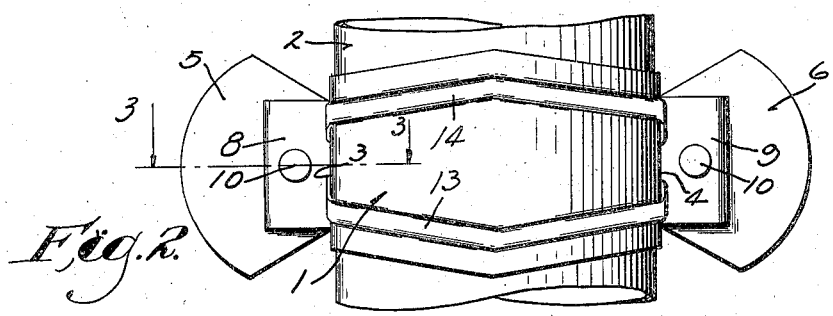
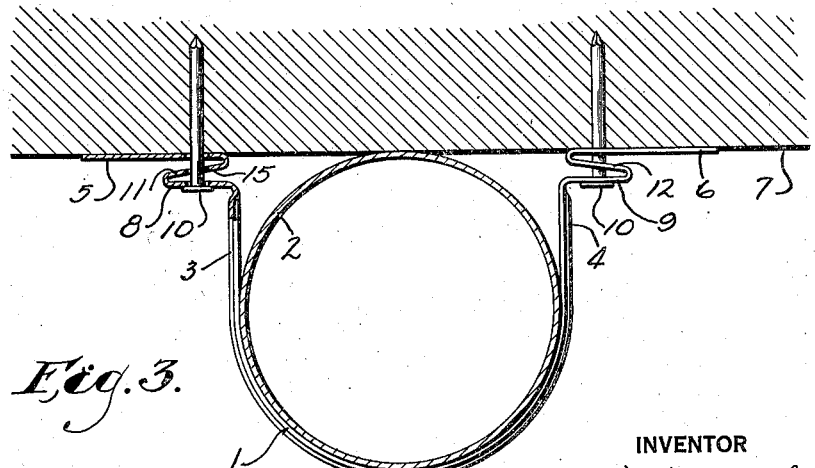
INVENTOR
William Konkel
BY Fred A. Parsons
ATTORNEY Patented Dec. 21, 1937

2,102,900

UNITED STATES PATENT OFFICE 2,102,900

RESILIENT CONDUCTOR FASTENING

William Konkel, Milwaukee, Wis., assignor to Milcor Steel Company, Milwaukee, Wis., a corporation of Delaware Application April 20, 1936, Serial No. 75,439

2 Claims. (Cl. 248—74)

This invention relates to bands or straps for use in the fastening of conductors, conduits or similar structures to surfaces such as the walls of buildings.

Fastening straps for such purposes have, in the past, been subject to certain defects. Any inequality in the diameter of the conduit or in the position thereof relative to the surface against which it is to be fixed results in an angular position of the strap surfaces against which the fastening nails or screws are seated, or in angularity of the strap surfaces intended to be seated against the wall surface, or both, whereby it is not possible to effect a satisfactory fastening except for the exact diameter of conduit and the exact wall spacing for which the strap was intended.

It is a purpose of the invention to provide an improved conductor strap or fastening which avoids the previous defects of such devices and which is perfectly adapted for variations in size and spacing of the conduit.

The invention consists in the construction, combination and relationship of elements hereinafter illustrated, described, and claimed, and in such modification of the structure illustrated and described as may be equivalent to the structure claimed.

The same reference characters have been used to indicate the same parts throughout and in the drawing:

Fig. 1 shows a conductor pipe or conduit fastened against a vertical wall, using the improved fastening means of the invention.

Fig. 2 is a front view of the conductor pipe and fastening means.

Fig. 3 is a horizontal section through the wall, pipe and fastening means, taken approximately along the line 3—3 of Fig. 2.

Fig. 4 shows a portion of the fastening means, adjusted from the position shown in Fig. 3 to accommodate a larger pipe.

Fig. 5 shows an alternative method of constructing the ends of the improved strap.

The strap or band includes a portion 1 adapted to closely frictionally engage the conductor pipe or conduit 2 whereby to pull it against the wall surface and to prevent relative axial shifting. Fixed with the portion 1 are the side portions 3 and 4, extending in the direction of the wall surface to which the pipe or conduit is to be fixed. Flat wall surface bearing portions 5 and 6 provide surfaces parallel with the wall surface and respectively associated with the side portions 3 and 4 to seat against the wall surface 7.

Respectively associated with side portions 3 and 4 are also the portions 8 and 9, providing suitable bearing surface parallel with the wall surface for the underneath sides of the heads of fastening means such as nails 10. The portions 8 and 9 are respectively joined with the portions 5 and 6 by the means of angularly disposed extensible or flexible portions 11 and 12. Fig. 4 shows one of the portions flexed or extended to provide for an oversize conduit, or an increased spacing from the conduit to the wall. Fig. 5 shows an alternative form having a flexible or extensible strap portion 11a.

Preferably the several portions of the strap as disclosed are made from a single stamping with all the described elements in one piece as shown. Suitable corrugations or ribs, such as 13, 14 may be struck up to strengthen the portion 1, and similar ribs may be used to strengthen other portions of the strap excepting that it is preferable to avoid such ribs where the portions 11 and 12 join the other portions, in order to retain flexibility at these points.

As illustrative of the improved utility of the device, Fig. 4 shows the position assumed by the end portions of the band in the event that, for instance, the conduit is oversized at the point where the strap is applied. In such case, the additional length of strap required is obtained by the angular adjustment of the portion 11 while still retaining perfectly aligned and positioned surfaces for the underneath portion of the head of the fastening nails 10 and for contacting the wall 7.

Suitably aligned holes or openings are provided, as at 15, extending through the several associated portions such as 5, 8 and 11, to permit insertion of the nails or fasteners 10. These openings are sufficiently large to permit of relative adjustment of the portions as described while still permitting of free entry of the fastening elements therethrough.

What is claimed is:

1. A fastening means for articles such as conductors, conduits and the like including a metallic strap having a portion for engaging the article and an end part apertured to receive a fastener such as a nail, the end part providing spaced parallel abutment portions respectively for the nail head bearing and for a wall surface bearing and an intermediate resilient portion adapted for distortion in a manner to maintain the parallel relationship of the abutment portions at various spacing thereof, 2. A fastening means for articles such as conductors, conduits and the like including a metallic strap having an intermediate portion for engaging the article and end parts respectively at opposite ends of said intermediate portion and each apertured to receive a fastener such as a nail, each end part providing spaced parallel abutment portions respectively for the nail head bearing and for a wall surface bearing and an intermediate resilient portion adapted for distortion in a manner to maintain the parallel relationship of the abutment portions at various spacings thereof.

WILLIAM KONKEL.